United States Patent
Mei et al.

(10) Patent No.: US 12,438,669 B2
(45) Date of Patent: Oct. 7, 2025

(54) DETERMINING CHANNEL STATE INFORMATION IN MULTI-TRANSMISSION RECEPTION POINT SYSTEMS

(71) Applicant: ZTE Corporation, Guangdong (CN)

(72) Inventors: Meng Mei, Shenzhen (CN); Shujuan Zhang, Shenzhen (CN); Zhaohua Lu, Shenzhen (CN); Chuangxin Jiang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 362 days.

(21) Appl. No.: 18/149,328

(22) Filed: Jan. 3, 2023

(65) Prior Publication Data
US 2023/0143815 A1 May 11, 2023

Related U.S. Application Data

(63) Continuation of application No. PCT/CN2020/100402, filed on Jul. 6, 2020.

(51) Int. Cl.
*H04L 5/00* (2006.01)

(52) U.S. Cl.
CPC .......... *H04L 5/0051* (2013.01); *H04L 5/0035* (2013.01); *H04L 5/006* (2013.01)

(58) Field of Classification Search
CPC ..... H04L 5/0051; H04L 5/0035; H04L 5/006; H04L 1/08; H04L 5/0023; H04L 5/005; H04L 5/0053; H04L 5/0094; H04L 1/0026
See application file for complete search history.

(56) References Cited

U.S. PATENT DOCUMENTS

| | | | |
|---|---|---|---|
| 2019/0253904 A1* | 8/2019 | Tsai | H04W 16/14 |
| 2019/0268053 A1* | 8/2019 | John Wilson | H04B 7/0634 |
| 2020/0106645 A1 | 4/2020 | Tsai et al. | |
| 2020/0389883 A1 | 12/2020 | Faxer et al. | |

(Continued)

FOREIGN PATENT DOCUMENTS

| | | |
|---|---|---|
| CN | 105978677 A | 9/2016 |
| CN | 110249574 A | 9/2019 |
| CN | 110312276 A | 10/2019 |

(Continued)

OTHER PUBLICATIONS

Office Action for Chinese Patent Application No. 202080102800.8, mailed Mar. 23, 2024 (17 pages).

(Continued)

*Primary Examiner* — Kabir A Timory
(74) *Attorney, Agent, or Firm* — Perkins Coie LLP

(57) ABSTRACT

Methods, apparatuses, and systems for determining the measurement of reference signals in a wireless system are described. In one aspect, a wireless communication method is disclosed. The method includes determining measurement reference signal information based on transmission configuration indication (TCI) codepoint information, wherein the TCI codepoint information is indicated in a TCI field in a physical downlink control channel (PDCCH), wherein the reference signal measurement information includes a TCI codepoint index. The method further includes determining a measurement reference signal resource in a measurement reference signal resource set according the TCI codepoint index, and measuring the reference signal.

19 Claims, 8 Drawing Sheets

(56) References Cited

U.S. PATENT DOCUMENTS

2021/0410160 A1\* 12/2021 Guo ..................... H04W 72/21

FOREIGN PATENT DOCUMENTS

| | | |
|---|---|---|
| CN | 110798894 A | 2/2020 |
| CN | 110839290 A | 2/2020 |
| CN | 110945793 A | 3/2020 |
| CN | 110959268 A | 4/2020 |
| CN | 110972515 A | 4/2020 |
| CN | 111082912 A | 4/2020 |
| CN | 111226414 A | 6/2020 |
| CN | 111278120 A | 6/2020 |
| CN | 111316568 A | 6/2020 |
| WO | 2020059140 A1 | 3/2020 |
| WO | 2020088571 A1 | 5/2020 |
| WO | 2021107570 A1 | 6/2021 |
| WO | 2021206410 A1 | 10/2021 |

OTHER PUBLICATIONS

Ericsson, "MAC CEs for activating an RS resource and handling corresponding TCI states," 3GPP TSG-RAN WG2 #100, R2-1713533, Reno, US, Nov. 27-Dec. 1, 2017 (5 pages).
Cheng, G. et al., "Design and implementation of beam failure recovery in 5G," 5G Communication, China Telecom Beijing Research Institute, English abstract provided (4 pages).
Liu, J. et al., "Correlated MIMO Rayleigh Fading Systems with Transmit Channel State Information," IEEE 60th Vehicular Technology Conference, 2004 (5 pages).
Li, H. et al., "CQI measurement based on CSI-RS," China Academic Journal Electronic Publishing House, machine translated English abstract provided (5 pages).
First Examination Report for Australian Patent Application No. 2020457348, mailed Aug. 29, 2023 (3 pages).
Huawei et al., "Remaining issues on multi-beam enhancements in R16," 3GPP TSG RAN WG1 Meeting #100-e, R1-2000203, Feb. 24-Mar. 6, 2020 (8 pages).
Apple Inc., "Remaining Issues on Multi-beam operation," 3GPP TSG RAN WG1 #100-e, R1-2000860, e-Meeting, Feb. 24-Mar. 6, 2020 (12 pages).
Apple Inc., "Feature Lead Summary #2 on SCell BFR and L1-SINR," 3GPP TSG RAN WG1 #100-e, R1-2001182, e-Meeting, Feb. 24-Mar. 6, 2020 (7 pages).
Apple Inc., "Remaining Issues on Multi-beam operation," 3GPP TSG RAN WG1 #100b, R1-2002338, e-Meeting, Apr. 20-30, 2020 (10 pages).
Qualcomm, "Enhancements on Multi-beam Operation," 3GPP TSG RAN WG1 Meeting #100-Bis-e, R1-2002552, Apr. 20-Apr. 30, 2020 (8 pages).
Vivo, "On remaining issues on Multi beam," 3GPP TSG RAN WG1 #101, R1-2003398, e-Meeting, May 25-Jun. 6, 2020 (5 pages).
Mediatek, Inc., "Remaining issues on multi-beam operation," 3GPP TSG RAN WG1 #101, R1-2003661, e-Meeting, May 25-Jun. 5, 2020 (9 pages).
Samsung, "On Rel.16 support for multi-beam operation," 3GPP TSG RAN WG1 #101, R1-2003882, e-Meeting, May 25-Jun. 5, 2020 (4 pages).
Samsung, "On Rel.17 FeMIMO WI," 3GPP TSG RAN WG1 #101, R1-2003918, e-Meeting, May 25-Jun. 5, 2020 (12 pages).
OPPO, "Remaining Issues on Multi-beam Operation Enhancement," 3GPP TSG RAN WG1 #101, R1-2004048, e-Meeting, May 25-Jun. 5, 2020 (6 pages).
Apple, "Feature Lead Summary on L1-SINR and SCell BFR," 3GPP TSG RAN WG1 #101, R1-2004709, e-Meeting, May 25-Jun. 5, 2020 (15 pages).
Second Examination Report for Australian Patent Application No. 2020457348, mailed Jan. 22, 2024 (3 pages).
Vivo, "Maintenance for reference signals and QCL," 3GPP TSG RAN WG1 Meeting #94bis, R1-1810367, Chengdu, China, Oct. 8-12, 2018 (5 pages).
International Search Report and Written Opinion for International Application No. PCT/CN2020/100402, mailed on Mar. 26, 2021 (8 pages).
Extended European Search Report for European Patent Application No. 20944504.8, mailed Jul. 3, 2023 (14 pages).
Huawei et al., "Summary of AI: 7.2.8.2 Enhancements on Multi-TRP/Panel Transmission of Offline Discussion," 3GPP TSG RAN WG1 Meeting #97, R1-1907706, Reno, USA, May 13-17, 2019 (66 pages).
Nokia et al., "Feature lead summary on QCL," 3GPP TSG RAN WG1#93, R1-1807664, Busan, Korea, May 21-25, 2018 (40 pages).
AT&T (Moderator), "Summary of UE features for eMIMO," 3GPP TSG RAN WG1 #101, R1-2004285, e-Meeting, May 25-Jun. 5, 2020 (52 pages).
Office Action for Korean Patent Application No. 10-2023-7000627, mailed Apr. 20, 2025, with English summary (9 pages).
Communication pursuant to Article 94(3) EPC for European Patent Application No. 20944504.8, mailed Apr. 29, 2025 (11 pages).

\* cited by examiner

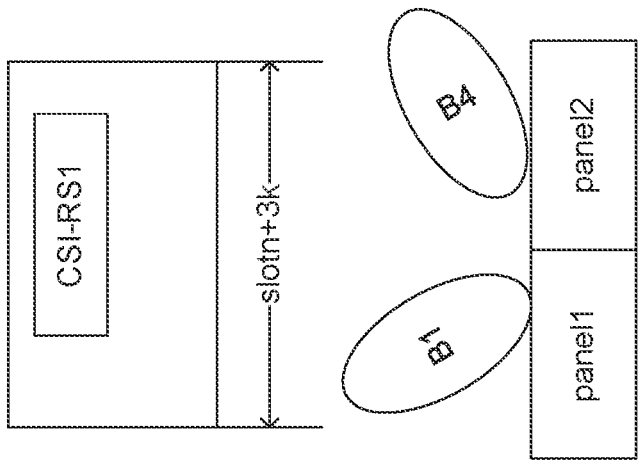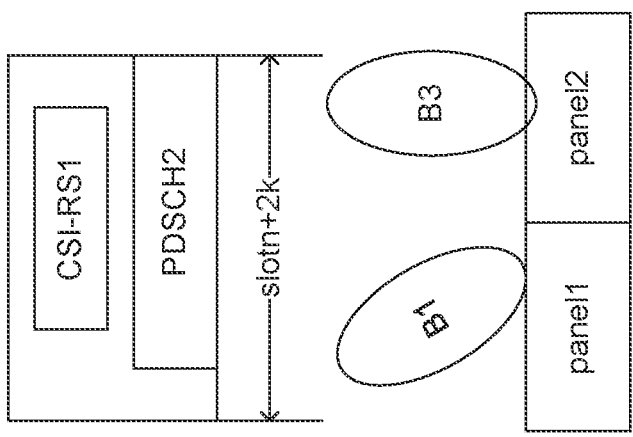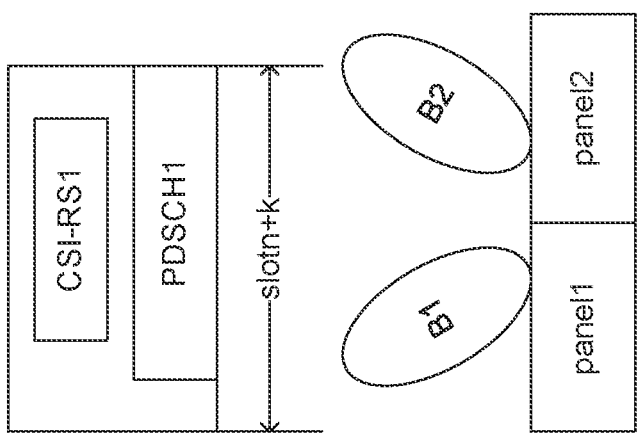
FIG. 3

600

610 — Determining reference signal measurement information based on transmission configuration indication (TCI) codepoint information, wherein the TCI codepoint information is indicated in a TCI field in a physical downlink control channel (PDCCH), wherein the reference signal measurement information includes a TCI codepoint index

620 — Determining, a measurement reference signal resource in a measurement reference signal resource set according the TCI codepoint index

630 — Measuring the reference signal

FIG. 6

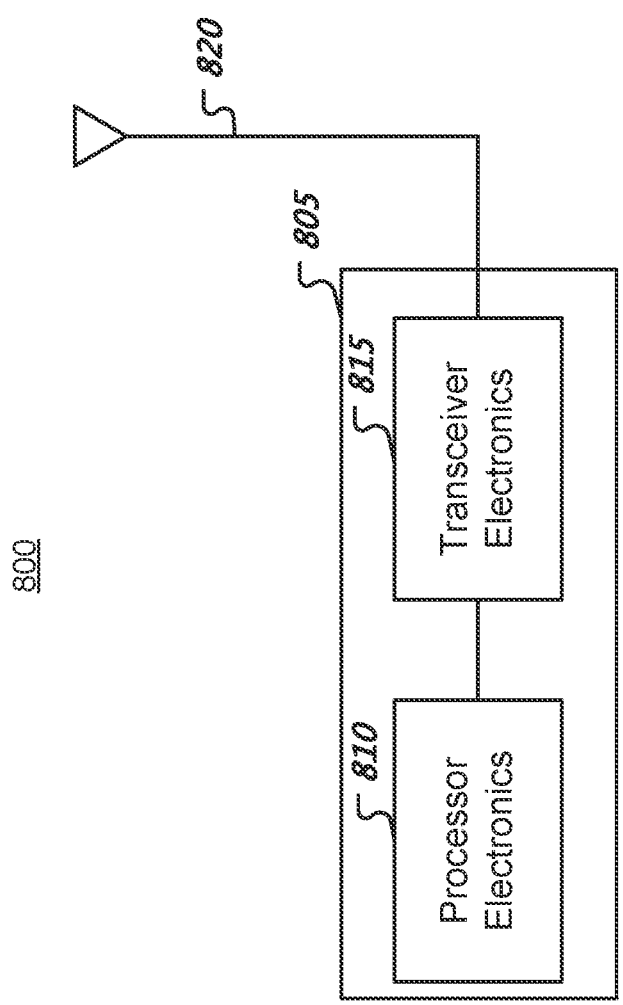

DETERMINING CHANNEL STATE INFORMATION IN MULTI-TRANSMISSION RECEPTION POINT SYSTEMS

CROSS REFERENCE TO RELATED APPLICATIONS

This patent document is a continuation of and claims benefit of priority to International Patent Application No. PCT/CN2020/100402, filed on Jul. 6, 2020. The entire content of the before-mentioned patent application is incorporated by reference as part of the disclosure of this application.

TECHNICAL FIELD

This patent document is directed generally to wireless communications.

BACKGROUND

With the development of wireless communications technology, the transmission rate, delay, throughput, reliability and other performance metrics of wireless communications systems have been improved by using high frequencies, large bandwidths, multiple antennas, as well as other technologies. To achieve high-performance wireless transmission, terminals carry out complex processing such as monitoring large control channel bandwidths, processing for data encoding and decoding for more complex control information and data information, etc. Reference signals are used to ensure proper functioning of high-performance systems. New methods of determining and measuring these signals are needed.

SUMMARY

This patent document describes, among other things, techniques, and apparatuses for measuring of reference signals.

In one aspect, a wireless communication method for determining a measurement reference signal is disclosed. The method includes determining reference signal measurement information based on transmission configuration indication (TCI) codepoint information. The TCI codepoint information is indicated in a TCI field in a physical downlink control channel (PDCCH), and the reference signal measurement information includes a TCI codepoint index. The method further includes determining a measurement reference signal resource in a measurement reference signal resource set according the TCI codepoint index, and measuring the reference signal.

These, and other, aspects are described in the present document.

BRIEF DESCRIPTION OF DRAWINGS

FIG. 3 depicts an example of two beams at three time slots, in accordance with some example embodiments.

FIG. 6 depicts an example of a process, in accordance with some example embodiments.

FIG. 8 depicts an example block diagram of a portion of a radio system, in accordance with some example embodiments.

DETAILED DESCRIPTION

Figure 1:
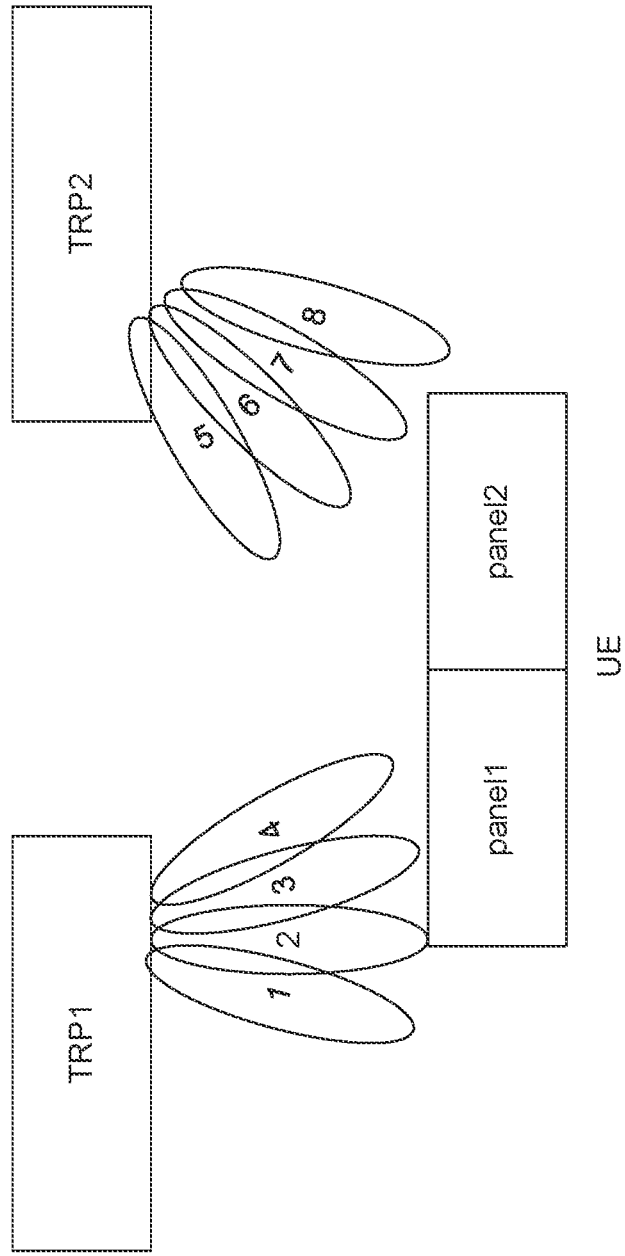
FIG. 1 depicts an example of a multi-transmission reception point (TRP) scenario, in accordance with some example embodiments.

Certain features are described using the example of Fifth Generation (5G) wireless protocol. However, applicability of the disclosed techniques is not limited to only 5G wireless systems. The disclosed subject matter relates to determining and measuring reference signals in a wireless communications system. Section headings and section numbers shown below are included to clarify some example embodiments.

In 5G systems, multiple transmission reception points (TRP) may be used. For example, each of two TRPs may perform beam training and select transmission beams separately without considering the interference from the other TRP. But when performing beam tracking or channel state indication (CSI) acquisition, each TRP should consider the interference from the other TRPs. Also, the resource indicator of the channel measurement resource (CMR) and interference measurement resource (IMR) is configured by radio resource control (RRC) signaling. Considering the candidate beam of the physical downlink shared channel (PDSCH) is updated by the media access control-control element (MAC CE), so the CMR and IMR configuration may not be as flexible as updating a candidate beam.

In the downlink system, the TRP performs beam training separately by configuring a synchronization signal block (SSB) or a channel state indicator-reference signal (CSI-RS). The MAC CE can activate and update the candidate beam by activating the transmission configuration indication (TCI) state indicated by a codepoint, and the TRP can choose one or some TCI state(s) in the TCI field by configuring a codepoint from the MAC CE and use the reference signal indicated in the codepoint as the transmitting beam.

When one TRP transmits on a PDSCH, CSI reporting and measurement is needed, and the TRP performs CMR and/or IMR. RRC signaling configures the CSI-RS resource used for CMR and IMR. The NZP CSI-RS resource configured the NZP-CSI-RS resource indicator to indicate the NZP-CSI-RS resource, the QCL information is configured by using the TCI state to indicate the spatial relation of the NZP-CSI-RS.

Example 1

In this example, the codepoint index or the codepoint index with a coreset pool index is contained in the CMR and/or IMR configuration. The codepoint index or the codepoint index with the coreset pool index is contained in a non-zero power channel state information reference signal (NZP-CSI-RS) resource set or a non-zero power channel state information reference signal (NZP-CSI-RS) resource configuration. The CMR or IMR can be configured in the CSI-RS resource set configuration.

The TRP can be configured for M TCI states using RRC signaling, e.g. 64 TCI states, and the MAC CE can activate several TCI states from the M TCI states, e.g. up to 8 activated TCI states. The 8 activated 8 TCI states can be separated into 8 groups, i.e., 8 codepoints where each group may have one or more TCI states, and the 8 groups are associated with the codepoint in the DCI field. Each TCI state contains parameters for configuring a quasi co-location (QCL) relationship between one or two downlink reference signals and demodulation reference signal (DM-RS) ports of the PDSCH, the DM-RS port of physical downlink control channel (PDCCH) or the CSI-RS port(s) of a CSI-RS resource. The downlink reference signals can be CSI-RS or SSB.

When the CMR is configured, the channel can be measured based on the configured resource, e.g. NZP CSI-RS resources. The CMR and/or IMR resource can be measured by, and/or configured by the RRC signaling. When the NZP-CSI-RS resource is configured in RRC signaling, the codepoint index can be configured in the NZP-CSI-RS resource set or the NZP-CSI-RS resource configuration.

The codepoint index contained in CMR and/or IMR provides the activated TCI state information. When the codepoint index or the codepoint index with the coreset pool index is updated, the CMR and IMR follows the updated TCI state information and performs the channel and interference measurement of the PDSCH with the updated TCI state information.

FIG. 1 depicts an example of a multi-TRP scenario, in accordance with some example embodiments. In the example of FIG. 1, each TRP has four candidate beams. TRP1 has four candidate transmission beams and accordingly the MAC CE can activate four TCI states. If TRP1 updates the codepoint, the TCI state the candidate beam changes too. If the CMR contains the codepoint index in the NZP-CSI RS resource, the CMR uses the changed TCI state and can perform channel and interference measurement immediately. This can be configured in CMR, IMR when the specific CSI-RS resource index is not configured, it is configured (CORESET group, codepoint index), so that after the MAC-CE updates the candidate beam of the PDSCH, it can measure the mutual interference and further reduce the amount of interaction between the TRPs.

In multi-TRP scenarios, such as the example shown in FIG. 1, two TRPs transmit data and reference signals to one UE, and the coreset pool index can be used to distinguish the two TRPs when multiple DCIs are supported. If the coreset pool index and codepoint index can be contained in the CMR and/or IMR, similar to a single TRP, the CMR and/or IMR can follow the activated TCI states. If one codepoint index indicates two TCI states for a single DCI in multi-TRP, the CMR and/or IMR can also perform on-time channel and/or interference measurement.

In some example embodiments, when one CMR is associated with interference to more than one codepoint, SINR based on the CMR and each interference should be calculated and the greatest of the SINR should be fed back. In some example embodiments, when one CMR is associated with interference to more than one codepoint, signal to interference plus noise ratio (SINR) based on the CMR and each interference should be calculated and the greatest of the SINR and the worst SINR should be fed back.

Figure 2:
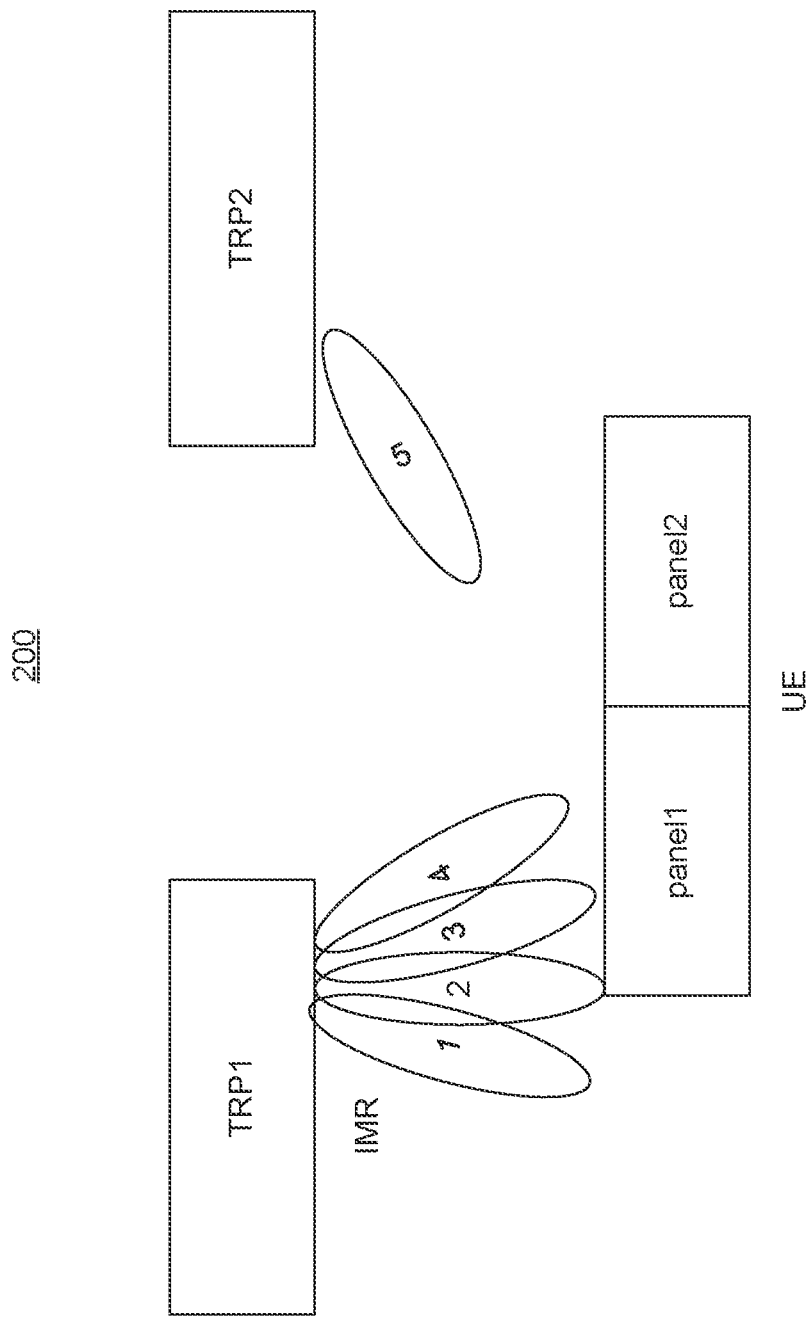
FIG. 2 depicts another example of a multi-TRP scenario, in accordance with some example embodiments.

FIG. 2 depicts another example of a multi-TRP scenario, in accordance with some example embodiments. In the example of FIG. 2, TRP1 has four candidate beams and TRP2 has one beam. The four candidate beams are marked as beams 1 to 4, and correspond to four TCI states indicated as four codepoints in TRP1 which are activated by the MAC CE. TRP2 has one candidate beam marked as beam 5. When CMR in TRP2 contains the codepoint of the TCI beam 5 and channel measurement is performed, the CSI-RS related to the four TCI states activated by the MAC CE are configured codepoints from TRP1 which can be configured as IMR. Considering a CMR and IMR configuration rule, the CMR and IMR resources should be associated. The CMR from TRP2 should be associated with the QCL-RS by different TCI states from the four codepoints of TRP1. Considering using the TCI state indicated in the DCI signaling would change dynamically. So as shown in FIG. 2, CMR should be transmitted four times to match the four codepoints from TRP1, and then four SINR values can be determined. The UE should feedback the SINR to TRP, so when only one SINR feedback is supported, the greatest SINR should be the one chosen as the feedback to the TRP. If multiple SINR feedback is supported, the greatest and the worst SINR can be fed back. The greatest SINR enables the TRP be able to choose the best beam to transmit the PDSCH, the feedback of the worst SINR enables the TRP to avoid to use the worst beam to transmit the PDSCH.

TRP1 dynamically selects between four codepoints, and TRP2 determines the SINR/CQI (channel quality indicator) corresponding to CMR5. One CMR of TRP2 corresponds to QCL-RS in a TCI state corresponding to four codepoints of TRP1 get SINR respectively, and then feedback the largest one, or the maximum SINR and worst SINR feedback When a codepoint corresponds to multiple TCI states, one of the multiple TCI states is used as IMR/CMR, or both TCI states are used as IMR.

In the case that another number of TCI states included in the TCI codepoint index is greater than one, the measurement reference signal resource set includes the QCL reference signal resource associated with a predefined TCI state in the multiple TCI states included in the TCI codepoint index. Considering the case that if one TCI codepoint indicated several TCI states, when the SINR is calculated based on one CMR and one IMR, but there are several CMR or IMR resources indicated by one codepoint, so one predefined TCI state can be supported.

The predefined TCI state can be configuration information of the CSI-RS resource set, a resource set index of the CSI-RS resource set, or a first TCI state of the multiple TCI states.

That means the predefined TCI state can be configured in the CSI-RS resource set, or associate with the configuration information if CSI-RS resource set or the resource set index, or to be simplify, the predefined TCI state can be the first TCI state in this codepoint index.

In some example embodiments, when one codepoint indicates more than one TCI state, the first TCI state should be the one used as CMR and/or IMR. In some example embodiments, when one codepoint indicates more than one TCI state, all of the TCI sates should be used as CMR and/or IMR.

If more than one TCI state is included in one codepoint, e.g., two TCI states, then the MAC CE activates multiple TCI states in one codepoint. If a codepoint index is configured in the CMR and/or IMR, which TCI state included in the codepoint should be used to calculate SINR. If the two TCI states are both used as CMR and/or IMR to calculate SINR, the UE can get the accurate SINR. One TCI state in the codepoint can be used as CMR and/or IMR, because when too many TCI states in one codepoint are used to calculate the SINR excessive complexity results. Furthermore, using the first TCI state in the codepoint which contains more than one TCI state as the default TCI state will reduce the complexity and the TRP can save the signaling to indicate which one of these TCI states is included in one codepoint can be used as CMR and/or IMR, When the QCL-RS is an NZP-CSI-RS with multiple ports, when calculating the IMR, assumptions about the precoder matrix indicator (PMI), such as random PMI, etc., and each CSI-RS port are interference layers.

A random precoding matrix should be enabled for IMR calculations in the case of more than one NZP-CSI-RS port is configured for IMR.

If the QCL-RS contained in the TCI state includes more than one NZP-CSI-RS port, then interference is calculated based on the NZP-CSI-RS ports, and the PMI should be considered. When one TRP configures IMR to estimate the interference from other TRPs, PMI is one of the parameters for SINR calculation. If a unit matrix is configured, the interference based on these NZP-CSI-RS ports is independent, and each NZP-CSI-RS port receives one interference. If a random matrix of the PMI is indicated, one interference is received by several NZP-CSI-RS ports, and the interference should be calculated based on the combined interference signal based on the random PMI matrix.

In FIG. 2, since there may be four QCL-TypeD associated with IMR, CMR needs to be repeated four times. When CCL QCL-TypeD is not configured, CMR QCL-TypeD is determined according to IMR QCL-Type D; or CMR QCL-TypeD is a combination of QCL-TypeD configured by CMR and NZP-CSI-RS-IMR. When the two correspond to different panels, SINR is calculated based on the two panels.

If the QCL-TypeD of the CMR is not configured and the QCL-TypeD of IMR is configured, the CMR is QCLed with the IMR.

The number of spatially related parameters of the IMR in FIG. 2 is four, i.e., four QCL-TypeD is configured. So, the CMR from TPR2 should repeat four times. If the QCL-TypeD is not configured in CMR configuration, and considering the association between CMR and IMR, the QCL-TypeD of CMR can be indicated by the QCL-TypeD of IMR, e.g. the QCL-TypeD of the IMR can be used as the QCL-TypeD of IMR or the QCL-TypeD of CMR can be calculated based on the QCL-TypeD of IMR.

When NZP-CSI-RS-IMR is configured, the QCL-TypeD which is combined of CMR and the QCL-TypeD of NZP-CSI-RS-IMR can be used as the QCL-TypeD of CMR. As is shown in FIG. 2, UE has two panels, that means UE can receive two beams by using different panels, so the UE can receive IMR and CMR by using panel1 and panel 2 respectively, SINR can be calculate based on two panels.

If the codepoint index is configured in the CMR and/or IMR configuration, the time restriction should be configured. If the time restriction of CMR and/or IMR is configured, the CMR and/or can be calculated based on the most recent CSI-RS configuration, i.e., the codepoint with most recent activated TCI states. Considering that if multiple MAC CE updated the codepoint before the CMR and/or IMR calculation, the CSI reporting should choose the resources used for CMR and/or IMR, so the time restriction should be configured, and the CMR and/or IMR can be calculated and the CSI reporting can be configured based on the most recent resources.

Example 2

The codepoint index is configured as QCL information in the NZP-CSI-RS resource configuration.

CMR's TCI state and/or NZP-CSI-RS resource configuration can be configured (CORESET group, codepoint index) or only the codepoint index may be configured, so that when the MAC-CE updates the codepoint, the TCI state corresponding to the CMRs also changes. No additional use signaling configures the TCI state of CMR, which is equivalent to PDSCH and CMR reaching a unified TCI. These CMRs are used to specifically follow the channel quality of the candidate beam of the PDSCH in real time.

When CMR is configured, the channel can be measured based on the configured resource, e.g., NZP CSI-RS resources, the TCI state information configured in the NZP CSI-RS resource can indicate the QCL information. The codepoint index or the codepoint index with coreset pool index configured as the QCL information will indicate the activated TCI, and the TCI state in the CMR configuration will change according to the codepoint configured to the CMR if the candidate TCI state in the MAC CE is changed.

If more than one coreset pool are configured, the codepoint index with coreset pool index can also be configured in the NZP-CSI-RS resource configuration as the QCL information. If the codepoint index indicate different TCI state in different coreset pool, coreset pool index can also be configured in the NZP-CSI-RS resource configuration. The codepoint with different coreset pool index may activate the TCI states from different TRPs.

A unified TCI between CMR and PDSCH can be configured to achieve the immediate channel measurement of the candidate beam, e.g. activated TCI states in MAC CE.

Other performance as the codepoint is configured in the CMR and/or IMR configuration was introduced in Example 1 can also be used in this example.

Example 3

The codepoint index should be configured as the QCL information reference signal in the TCI state configuration.

When CMR is configured, the channel can be measured based on the configured resource, e.g., NZP CSI-RS resources, the TCI state configured in the NZP CSI-RS resource can indicate the QCL information.

The TCI state configuration contains the configuration of QCL information to associate one or two DL reference signals. The codepoint index can be one choice to configure the QCL information of the TCI state.

If the NZP-CSI-RS resources used for CMR and/IMR are configured, the TCI state configuration can choose the codepoint index or the codepoint index with coreset pool index as the QCL information. The codepoint is activated by the MAC CE, so the CMR and/or IMR resources are associated with the codepoint in the MAC CE. If the MAC CE updates the codepoint, i.e., the different TCI states are activated and deactivated, the QCL information indicated by the codepoint is changed, and the QCL information of the NZP-CSI-RS resource used for CMR and/or IMR is also changed to the updated codepoint which is activated by the MAC CE signaling.

In a case that a number of the TCI states included in the TCI codepoint index is greater than one, the QCL reference signal in the measurement reference signal resource include the QCL reference signal resource associated with predefined TCI state in the multiple TCI states included in the described TCI codepoint index. Considering the case that if one TCI codepoint indicated several TCI states, when the SINR is calculated based on one CMR and one IMR, but there are several CMR or IMR resources indicated by one codepoint, so one predefined TCI state can be supported.

The predefined TCI state can be configuration information of the CSI-RS resource, a resource set index of the CSI-RS resource, or a first TCI state of the multiple TCI states. That means the predefined TCI state can be configured in the CSI-RS resource, or associate with the configuration information if CSI-RS resource or the resource index, or to be simplify, the predefined TCI state can be the first TCI state in this codepoint index.

A unified TCI between CMR (and/or IMR) and PDSCH can be configured to achieve the immediate channel measurement of the candidate beam, e.g., activated TCI states in MAC CE.

Other performance as the codepoint is configured in the CMR and/or IMR configuration introduced in Example 1 can also be used in this example.

Example 4

The CSI reporting of CQI, PMI, and rank indicator (RI) of CSI-RS resource indicator (CRI) can be configured based on several slots of the periodic CSI-RS.

In Rel-17, if multiple QCL-TypeDs are allowed at one time domain symbol, when a CSI report is obtained at multiple times based on multiple periods of CSI-RS, it will appear as shown in FIG. 3. At this time, the other signal of the same time domain symbol at different moments is different from that of CSI-RS, and the beam output by panel 2 will be different. The reported CSI is based on that receive beam or receive beam combination.

If there are many transmitting panels in one TRP, then multiple QCL-TypeD are supported for simultaneous transmission on one OFDM symbol. Considering the QCL-TypeD of the CSI-RS can be configured the same as the other signal in the same symbol as shown in FIG. 3.

As is shown in FIG. 3, panel1 transmit CSI-RS1 with the same QCL-TypeD on different slot, i.e. slot n+k, slot n+2k and slot n+3k. As shown above, CSI-RS1 has the same QCL-TypeD with other signals at the same symbol, so at slot n+k, CSI-RS1 has the same QCL-TypeD as PDSCH1 because they are on the same symbol at that slot. Similarly, at slot n+2k, CSI-RS1 has the same QCL-TypeD as PDSCH2, and at slot n+3k, there is no PDSCH transmission, the CSI-RS1 may has another QCL-TypeD with other signals.

The QCL-TypeD of CSI-RS1 is different on different slot, because the other signals have different QCL-TypeD at different slots. TRP can transmit CSI-RS1 with different beams on panel2, as shown in FIG. 3.

Figure 4:
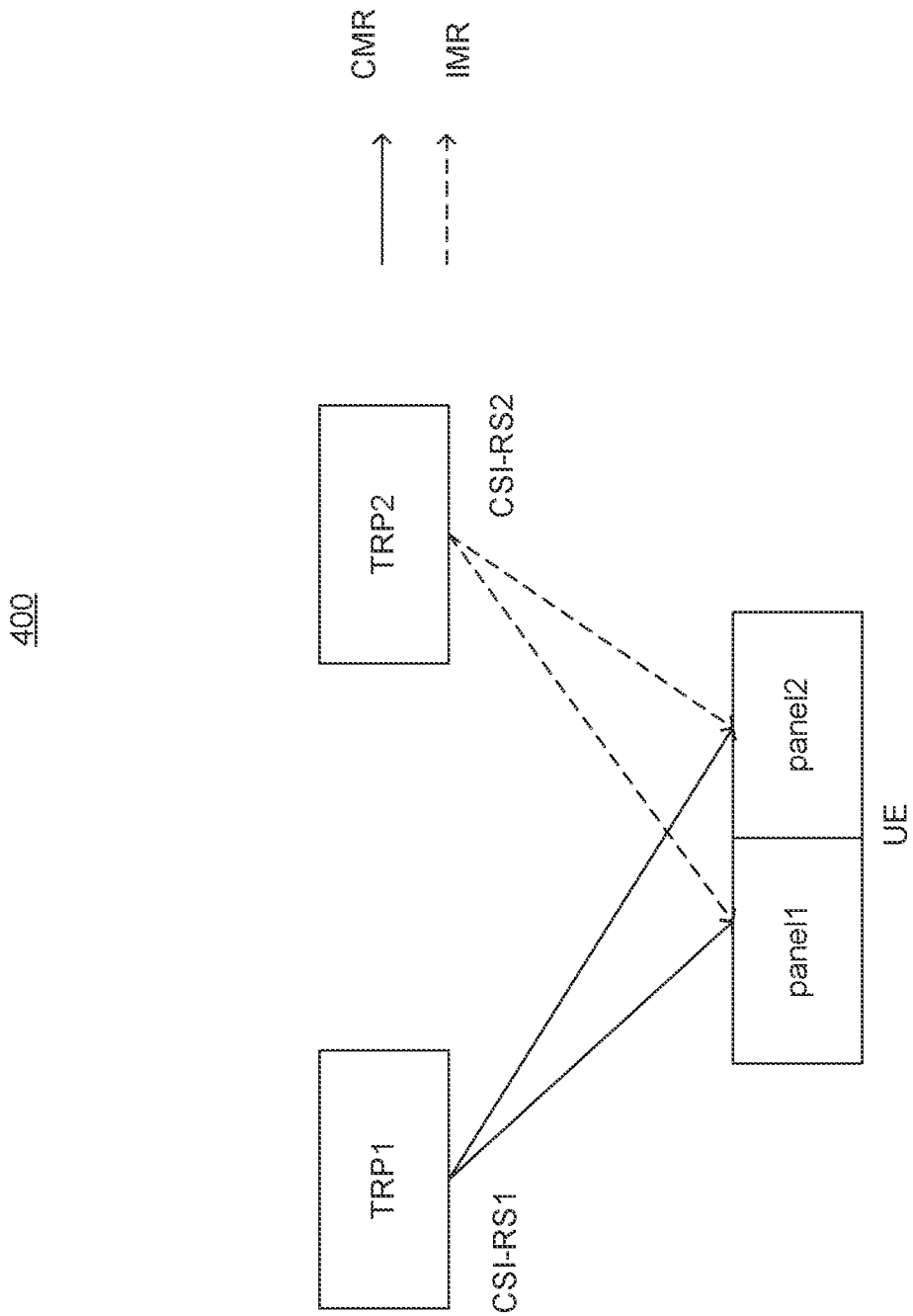
FIG. 4 depicts another example of a multi-TRP scenario, in accordance with some example embodiments.

For SINR simulation in the multiple TRP scenario as shown in FIG. 4, CMR is configured as CSI-RS1 from TRP1, and IMR is configured as CSI-RS2 form TRP2. Two simultaneous transmitting beams are supported on one symbol from one TRP, and the UE can receive the CMR configured from TRP1 by using panel1 and panel2 as the same as shown in FIG. 3, i.e. the UE uses panel1 to receive the CMR transmitted by panel1 in TPR1 and the UE uses panel2 to receive the CMR transmitted by panel2 in TPR1. Similarly, the UE receives IMR from TRP2 by using different receiving panels.

Considering that the CSI reporting is based on the CSI-RS on several slot, so which beam(s) should be used to perform CMR and/or IMR measurement that is used for CSI reporting should be determined.

Example Solutions:
 1. CSI is reported once, and it is obtained based on multiple measurements of CSI-RS, and the receive filter of CSI-RS is the same in multiple measurements;
 2. Clear the panel-ID corresponding to CSI, for example, all based on panel1;
 3. When a CSI is reported and the QCL-TypeD corresponding to multiple CSI-RS measurements is different, the restriction is determined based on the most recent QCL-TypeD and/or Time restriction is activated;
 4. Added panel ID in QCL-Type D;
 5. Multiple TCI states are configured for CSI-RS, and only the QCL-Type D of other signal satisfies the received condition of the configured TCI state, and is included in the current CSI measurement time.

Example Schemes:
Using the same CSI-RS receiving filter when one CSI reporting is based on multiple CSI measurements. The CSI-RS reporting is based on multiple CSI-RS measurements, the CSI-RS receiving filter should be the same in these CSI-RS measurements. The CSI-RS receiving filter makes the UE receive specific beams, and do not receive the other beams, so the CSI-RS transmitted on the special beams on panel2 can be received. This special beam can be one of the transmitting beams, and also can be the combined beam which is weighting with the transmitting beams on panel2 on different slot.

Figure 5:
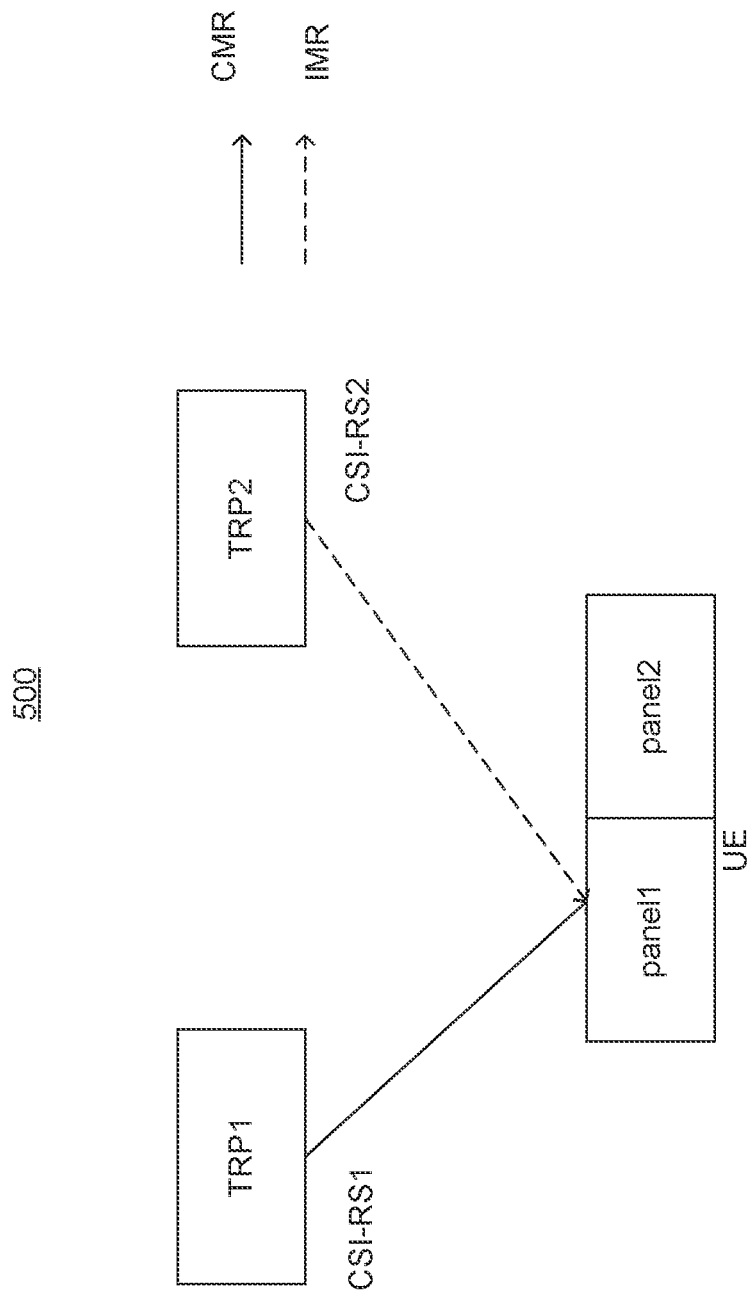
FIG. 5 depicts a channel measurement resource (CMR) and an interference measurement resource (IMR) received by a UE, in accordance with some example embodiments.

The CMR and/or IMR in the CSI measurement is used when CSI reporting is based on a specific panel, e.g., panel1. Because the beam of the CSI-RS transmission is the same on different slots, the CMR and IMR is calculated based on the same beam. Considering the scenario in FIG. 4, the UE uses panel1 to receive the CMR transmitted by panel1 in TPR1 and the UE uses panel2 to receive the CMR transmitted by panel2 in TPR1. Similarly, the UE receives IMR from TRP2 by using different receiving panels. Considering the CMR and IMR transmitting beam from transmitting panel1 in TRP1 and TRP2 is unchanged at different time slots and received by receiving panel1 at the UE, that will be reduce complexity for CSI reporting, which can be seen in FIG. 5.

Configure time restriction of channel and/or interference measurement when one CSI reporting is based on multiple QCL-TypeD CSI measurements. The time restriction of channel is configured to make the CSI reporting based on the most recent CSI measurement. As is shown in FIG. 3, if the CSI reporting time is on the slot later than slot n+3k, the CSI measurement on slot n+3k can be used for CSI reporting.

FIG. 6 depicts an example of a method 600, in accordance with some example embodiments. At 610, the method includes determining reference signal measurement information based on transmission configuration indication (TCI) codepoint information, wherein the TCI codepoint information is indicated in a TCI field in a physical downlink control channel (PDCCH), wherein the reference signal measurement information includes a TCI codepoint index. At 620, the method includes determining a measurement reference signal resource in a measurement reference signal resource set according the TCI codepoint index. At 630, the method includes, measuring the reference signal.

Figure 7:
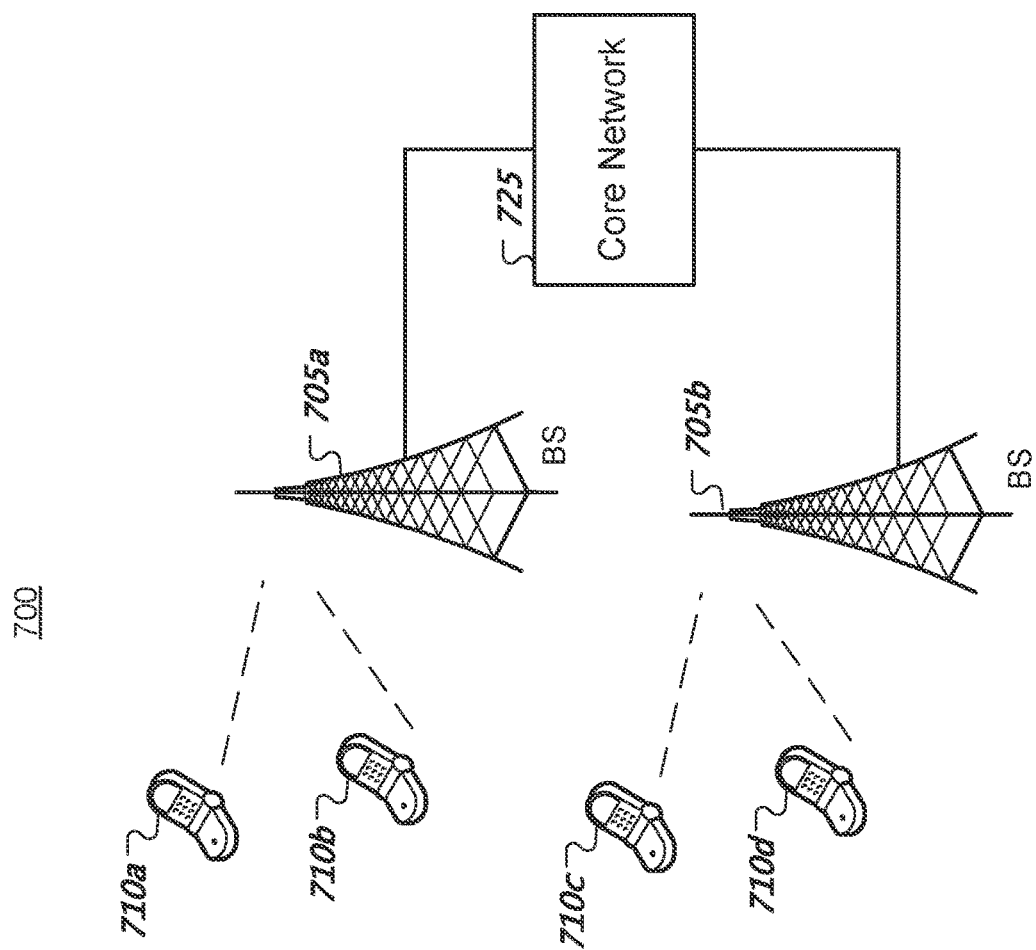
FIG. 7 depicts an example of a wireless communication system, in accordance with some example embodiments.

FIG. 7 shows an example of a wireless communication system 700 where techniques in accordance with one or more embodiments of the present technology can be applied. A wireless communication system 700 can include one or more base stations (BSs, gNB, eNB, etc.) 705a, 705b, one or more wireless devices 710a, 710b, 710c, 710d, and a core network 725. A base station 705a, 705b can provide wireless service to wireless devices 710a, 710b, 710c and 710d in one or more wireless sectors. In some implementations, a base station 705a, 705b includes directional antennas to produce two or more directional beams to provide wireless coverage in different sectors.

The core network 725 can communicate with one or more base stations 705a, 705b. The core network 725 provides connectivity with other wireless communication systems and wired communication systems. The core network may include one or more service subscription databases to store information related to the subscribed wireless devices 710a, 710b, 710c, and 710d. A first base station 705a can provide wireless service based on a first radio access technology, whereas a second base station 705b can provide wireless service based on a second radio access technology. The base stations 705a and 705b may be co-located or may be separately installed in the field according to the deployment scenario. The wireless devices 710a, 710b, 710c, and 710d can support multiple different radio access technologies. The techniques and embodiments described in the present document may be implemented by the base stations, other network entities, and/or by wireless devices described in the present document, or a combination of base station and mobile device equipment.

FIG. 8 is a block diagram representation of a portion of a radio station in accordance with one or more embodiments of the present technology can be applied. A radio station 805 such as a base station, other network entity, or a wireless device (or UE) can include processor electronics 810 such as a microprocessor that implements one or more of the wireless techniques presented in this document. The radio station 805 can include transceiver electronics 815 to send and/or receive wireless signals over one or more communication interfaces such as antenna 820. The radio station 805 can include other communication interfaces for transmitting and receiving data. Radio station 805 can include one or more memories (not explicitly shown) configured to store information such as data and/or instructions. In some implementations, the processor electronics 810 can include at least a portion of the transceiver electronics 815. In some embodiments, at least some of the disclosed techniques, modules or functions are implemented using the radio station 805. In some embodiments, the radio station 805 may be configured to perform the methods described herein.

Summary

In some example embodiments, the codepoint index or the codepoint index with coreset pool index is contained in the CMR and/or IMR configuration.

In some example embodiments, the codepoint index or the codepoint index with coreset pool index is configured in NZP-CSI-RS resource indication.

In some example embodiments, the codepoint index is configured as QCL information in the NZP-CSI-RS resource configuration.

In some example embodiments, the codepoint index is configured as the QCL information reference signal in the TCI state configuration.

In some example embodiments, if one CMR is associated with interference with more than one codepoint, SINR based on the CMR and each interference is calculated and the greatest of the SINR should be fed back.

In some example embodiments, when one codepoint indicates more than one TCI states, the first TCI state in the codepoint should be the one used as CMR and/or IMR In some example embodiments, a random precoding matrix should be enabled for IMR calculation in the case of more than one NZP-CSI-RS port being used for IMR are configured.

In some example embodiments, when the QCL-TypeD of the CMR is not configured and the QCL-TypeD of IMR is configured with a codepoint, the CMR is QCL'd with the IMR.

In some example embodiments, a time restriction should be configured if the codepoint index is configured in the CMR and IMR configuration.

It will be appreciated that the present document discloses techniques that can be embodied in various embodiments to establish and manage sessions in various scenarios. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for measuring a measurement reference signal performed by a user equipment (UE), comprising:
    determining reference signal measurement information using transmission configuration indication (TCI) codepoint information, wherein the TCI codepoint information is indicated in a TCI field in a physical downlink control channel (PDCCH) received by the UE, wherein the reference signal measurement information includes a TCI codepoint index;
    determining a measurement reference signal resource in a measurement reference signal resource set according to the TCI codepoint index; and
    measuring the measurement reference signal,
    wherein, in a case that a number of multiple TCI states included in the TCI codepoint index is greater than one, a quasi co-location (QCL) reference signal in the measurement reference signal resource includes an associated QCL reference signal resource associated with a predefined TCI state in the multiple TCI states included in the TCI codepoint index.

2. The method of claim 1, wherein the measurement reference signal resource set includes a quasi co-location (QCL) reference signal resource in a TCI state included in the TCI codepoint index.

3. The method of claim 2, wherein
    in a case that a number of the QCL reference signal resources in the TCI state is greater than one, the measurement reference signal resource set includes the QCL reference signal resource associated with a predefined QCL parameter in the TCI state included in the TCI codepoint index, and
    in another case that another number of multiple TCI states included in the TCI codepoint index is greater than one, the measurement reference signal resource set includes the QCL reference signal resource associated with a predefined TCI state in the multiple TCI states included in the TCI codepoint index.

4. The method of claim 3, wherein the predefined TCI state of the multiple TCI states can be obtained from one or more of
    configuration information of the measurement reference signal resource set,
    a resource set index of the measurement reference signal resource set, or
    a first TCI state of the multiple TCI states.

5. The method of claim 3, wherein the TCI codepoint index is configured in a transmission configuration indication (TCI) state configuration.

6. The method of claim 5, wherein a QCL reference signal of the measurement reference signal resource is obtained from the TCI state of the TCI codepoint index.

7. The method of claim 1, wherein the predefined TCI state of the multiple TCI states can be obtained from one or more of
    configuration information of the measurement reference signal resource,
    a resource set index of the measurement reference signal resource, or
    a first TCI state of the multiple TCI states.

8. The method of claim 1, wherein a time restriction of a measurement reference signal reporting is configured with a configuration of a codepoint index in the measurement reference signal.

9. The method of claim 1, wherein a time restriction is configured once a media access control-control element (MAC-CE) activates or updates an association between a codepoint and a TCI state in the TCI field.

10. The method of claim 1, wherein a TCI codepoint is associated with a control resource set (CORESET) pool, wherein the TCI codepoint is indicated in the TCI field in the PDCCH of the associated coreset pool.

11. The method of claim 3, wherein
    one codepoint is associated with one or more of the multiple TCI states,
    a TCI state in the TCI field indicates the QCL reference signal, and
    an association of a codepoint and the TCI state in the TCI field is activated and updated by a MAC-CE.

12. The method of claim 11, wherein, after the MAC CE activates or updates the association between the codepoint and the TCI state in the TCI field, the measurement reference signal resource information is obtained from the activated or updated TCI codepoint.

13. The method of claim 1, wherein the measurement reference signal includes at least one of a channel measurement reference signal, or an interference measurement reference signal.

14. The method of claim 4, wherein a channel measurement resource (CMR) is quasi located (QCLed) with an interference measurement resource (IMR) in a case that a QCL-TypeD of the CMR is not configured and the QCL-TypeD of the IMR is configured with the codepoint index.

15. The method of claim 4, wherein a signal to noise plus interference ratio (SINR) based on a CMR and each interference is calculated and a greatest SINR or a measurement reference signal resource indication with the greatest SINR is reported in a case that one CMR is associated with more than one interference resources.

16. A communication apparatus, comprising:
at least one processor configured to perform a method for measuring a measurement reference signal performed by a user equipment (UE), the method comprising:
determining reference signal measurement information using transmission configuration indication (TCI) codepoint information, wherein the TCI codepoint information is indicated in a TCI field in a physical downlink control channel (PDCCH) received by the UE, wherein the reference signal measurement information includes a TCI codepoint index;
determining a measurement reference signal resource in a measurement reference signal resource set according to the TCI codepoint index; and
measuring the reference signal,
wherein, in a case that a number of multiple TCI states included in the TCI codepoint index is greater than one, a quasi co-location (QCL) reference signal in the measurement reference signal resource includes an associated QCL reference signal resource associated with a predefined TCI state in the multiple TCI states included in the TCI codepoint index.

17. The apparatus of claim 16, wherein the measurement reference signal resource set includes a quasi co-location (QCL) reference signal resource in a TCI state included in the TCI codepoint index, wherein
in a case that a number of the QCL reference signal resources in the TCI state is greater than one, the measurement reference signal resource set includes the QCL reference signal resource associated with a predefined QCL parameter in the TCI state included in the TCI codepoint index, and
in another case that another number of multiple TCI states included in the TCI codepoint index is greater than one, the measurement reference signal resource set includes the QCL reference signal resource associated with a predefined TCI state in the multiple TCI states included in the TCI codepoint index.

18. A non-transitory computer readable media with executable instructions stored thereon, that when executed by at least one processor perform operations comprising:
determining reference signal measurement information using transmission configuration indication (TCI) codepoint information, wherein the TCI codepoint information is indicated in a TCI field in a physical downlink control channel (PDCCH), wherein the reference signal measurement information includes a TCI codepoint index;
determining a measurement reference signal resource in a measurement reference signal resource set according to the TCI codepoint index; and
measuring the reference signal,
wherein, in a case that a number of multiple TCI states included in the TCI codepoint index is greater than one, a quasi co-location (QCL) reference signal in the measurement reference signal resource includes an associated QCL reference signal resource associated with a predefined TCI state in the multiple TCI states included in the TCI codepoint index.

19. The non-transitory computer readable media of claim 18, wherein the measurement reference signal resource set includes a quasi co-location (QCL) reference signal resource in a TCI state included in the TCI codepoint index, and wherein
in a case that a number of the QCL reference signal resources in the TCI state is greater than one, the measurement reference signal resource set includes the QCL reference signal resource associated with a predefined QCL parameter in the TCI state included in the TCI codepoint index, and
in another case that another number of multiple TCI states included in the TCI codepoint index is greater than one, the measurement reference signal resource set includes the QCL reference signal resource associated with a predefined TCI state in the multiple TCI states included in the TCI codepoint index.

* * * * *